(No Model.)
W. J. CONRAD.
STORE COUNTER.
No. 253,981. Patented Feb. 21, 1882.
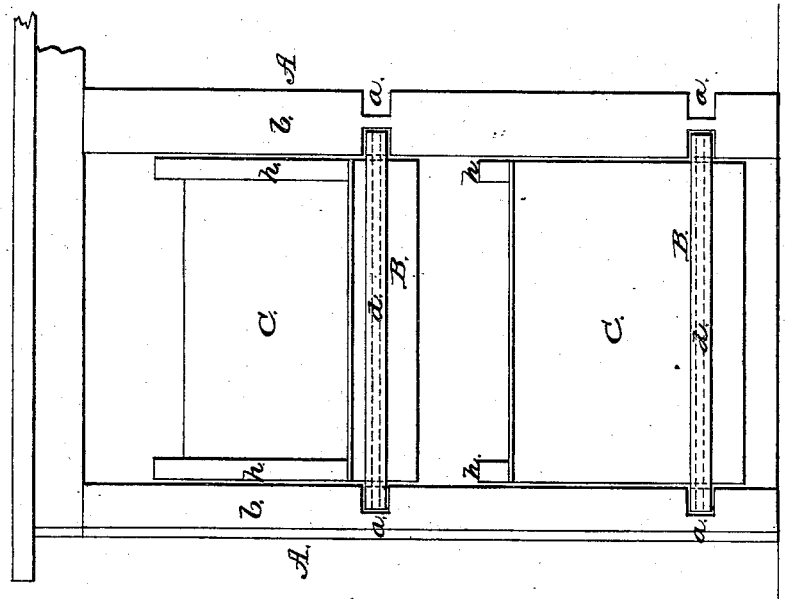
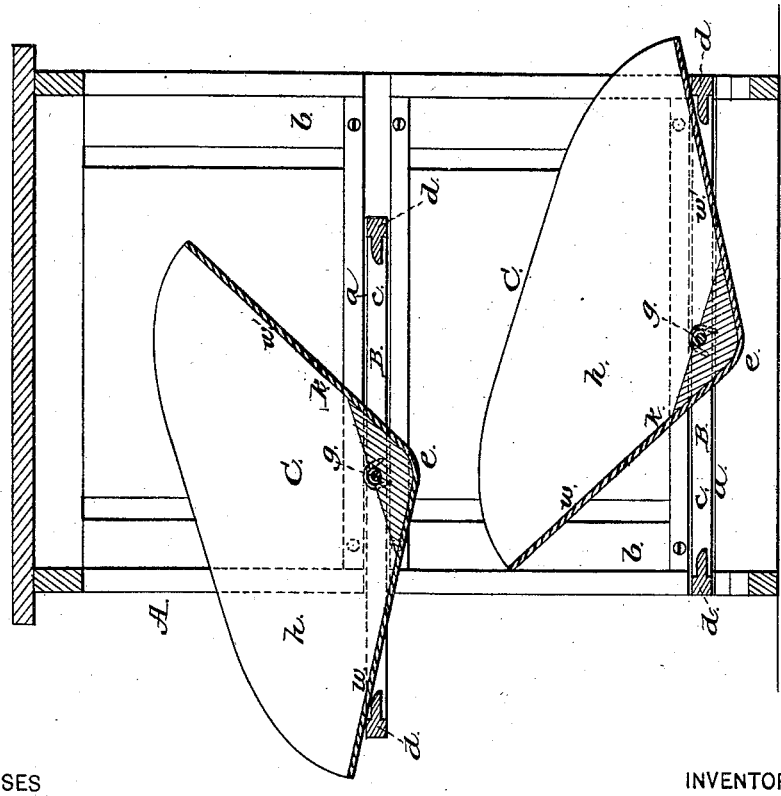
WITNESSES
John A. Ellis
Philip C. Ulasi
INVENTOR
W. J. Conrad
by Anderson & Smith
his ATTORNEYS
N. PETERS, Photo-Lithographer, Washington, D. C.

UNITED STATES PATENT OFFICE.

WILLIAM J. CONRAD, OF GAINESVILLE, TEXAS.

STORE-COUNTER.

SPECIFICATION forming part of Letters Patent No. 253,981, dated February 21, 1882.

Application filed November 26, 1881. (No model.)

*To all whom it may concern:*

Be it known that I, WM. J. CONRAD, a citizen of the United States, resident at Gainesville, in the county of Cook and State of Texas, have invented a new and valuable Improvement in Store-Counters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical cross-section, and Fig. 2 is a front view.

This invention has relation to improvements in store-counters; and it consists in the construction and novel arrangement of the horizontal slideways in the lower portion of the counter extending from front to rear, the rectangular slide-frames working therein, and the angular boxes pivoted by their lower and middle portions to the slide-frames and reversible therein by a rocking movement, as hereinafter set forth, and specially pointed out in the claim appended.

In the accompanying drawings, the letter A designates the counter-framing, having the horizontal slide-guides $a$, constructed by means of strips fastened to the uprights $b$, and extending from the front to the rear of the counter, said front and rear being both made open, as indicated.

B represents the rectangular slide-frames, which are seated in the slideways $a$, their side bars, $c$, resting in said ways and their end bars, $d$, extending transversely and connecting the ends of said side bars.

The boxes C are obtuse-angular in vertical section, and their lower portion or angular base, $e$, is supported on a central rod, $g$, which is connected to the rectangular frame B at each side. The boxes are connected to the rods by means of staples or other common bearings. The sides $h$ of the boxes are made of wood, while the bottom $k$ is usually made of sheet-iron. The sides $h$ are triangular in their general form, as indicated in the drawings, and the inclined walls $w$ $w'$ of the boxes are of sufficient length to extend from the pivot-rod $g$ beyond the end bars or bearings, $d$, of the rectangular frames.

It is apparent that each box C can be rocked on its pivot so as to face in either direction, front or rear, its inclined walls $w$ and $w'$ being respectively raised or lowered, according to requirement.

When the box is to be filled from the outside or front of the counter it is pushed out, together with its slide-frame, sufficiently for the purpose, and is tipped toward the front. After filling it can be pushed back into the counter and tipped to the rear, for convenience in handling the nails, coffee, rice, or other commodity therein. When turned toward the front of the counter these boxes serve as show-cases for the exhibition of different kinds or qualities of goods.

The boxes C, although angular, are symmetrical in form, being balanced in construction with reference to their pivotal supports, and are therefore easily moved.

In hanging the boxes on the pivotal rods their angular portion or base $e$ should be arranged lower than the end rests, $d$, of the rectangular slide-frames.

Having described this invention, what I claim, and desire to secure by Letters Patent, is—

The store-counter described, having the horizontal slideways $a$, extending from front to rear, the rectangular slide-frames B, having the central pivot-rods, $g$, and the end rests, $d$, and the symmetrical angular boxes C, pivoted by their angular portion to said rods of the slide-frames and reversible therein, substantially as specified.

In testimony that I claim the above I have hereunto subscribed my name in the presence of two witnesses.

WM. JENKENS CONRAD.

Witnesses:
C. N. STEVENS,
F. R. SHERWOOD.